(12) United States Patent
Itokawa

(10) Patent No.: US 6,404,901 B1
(45) Date of Patent: Jun. 11, 2002

(54) IMAGE INFORMATION PROCESSING APPARATUS AND ITS METHOD

(75) Inventor: Osamu Itokawa, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,357

(22) Filed: Jan. 25, 1999

(30) Foreign Application Priority Data

Jan. 29, 1998 (JP) .......................................... 10-016486
Jul. 14, 1998 (JP) .......................................... 10-198555

(51) Int. Cl.<sup>7</sup> ................................................ G06K 9/00
(52) U.S. Cl. ..................................................... 382/103
(58) Field of Search ................................ 382/100, 103, 382/107, 162, 165, 166, 173, 181, 192, 194, 195, 199, 203, 224, 225, 226, 227, 228, 232, 236, 276, 286, 291; 348/77, 78, 135, 142, 169, 153; 345/433, 441, 112, 113, 114, 150, 152

(56) References Cited

U.S. PATENT DOCUMENTS 4,636,862 A 1/1987 Hatori et al. ............ 348/420.1
5,237,405 A * 8/1993 Egusa et al. ................. 348/208
5,764,803 A * 6/1998 Jacquin et al. .............. 382/236
5,815,601 A * 9/1998 Katata et al. ................ 382/232
5,886,743 A * 3/1999 Oh et al. ..................... 375/240
5,929,912 A * 7/1999 Aono et al. .................. 375/240
5,987,184 A * 11/1999 Kweon et al. .............. 382/250
6,035,067 A * 3/2000 Ponicos ....................... 382/226
6,125,142 A * 9/2000 Han ........................ 375/240.1

FOREIGN PATENT DOCUMENTS

| EP | 0 389 044 A2 | 9/1990 | ............ H04N/7/13 |
| EP | 0 741 496 A2 | 11/1996 | ............ H04N/7/26 |
| EP | 0 833 515 A2 | 4/1998 | ............ H04N/7/26 |
| WO | WO 92/05662 | 4/1992 | ............ H04N/5/14 |
| WO | WO 94/05118 | 3/1994 | ............ H04N/5/75 |

* cited by examiner

*Primary Examiner*—Andrew W. Johns
*Assistant Examiner*—Shervin Nakhjavan
(74) *Attorney, Agent, or Firm*—Fitzpatrick, Cella, Harper & Scinto

(57) ABSTRACT

Image processing apparatus and method in which image data is inputted, the inputted image data is divided into blocks constructed by a plurality of pixels, a motion of the image data is detected every block, and at least the image data of a first object and the image data of a second object are classified from the image data in accordance with the detection result.

28 Claims, 25 Drawing Sheets

FIG. 5A
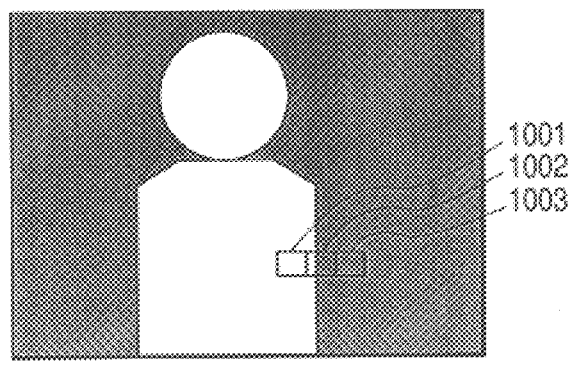
FIG. 5B  FIG. 5C  FIG. 5D
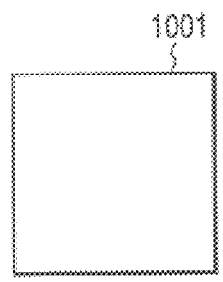 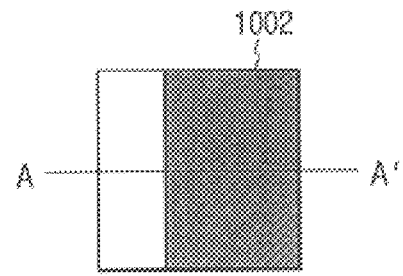 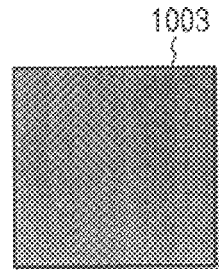

ENLARGED PORTION AROUND BOUNDARY BLOCK

ENLARGED PORTION AROUND BOUNDARY BLOCK

ENLARGED PORTION AROUND BOUNDARY BLOCK

SUBJECT BLOCK OF CURRENT
FRAME FOR MATCHING

MATCHING OF BACKGROUND
BLOCK IN PREVIOUS FRAME

MATCHING OF FOREGROUND
BLOCK IN PREVIOUS FRAME

CALCULATION OF MOTION VECTOR
OF SUBJECT BLOCK

CALCULATION OF MOTION VECTOR
OF FOREGROUND BLOCK

PREVIOUS FRAME     CURRENT FRAME

FOREGROUND PIXEL   BOUNDARY PIXEL   BACKGROUND PIXEL

FOREGROUND PIXEL   BOUNDARY PIXEL   BACKGROUND PIXEL

FIG. 33A
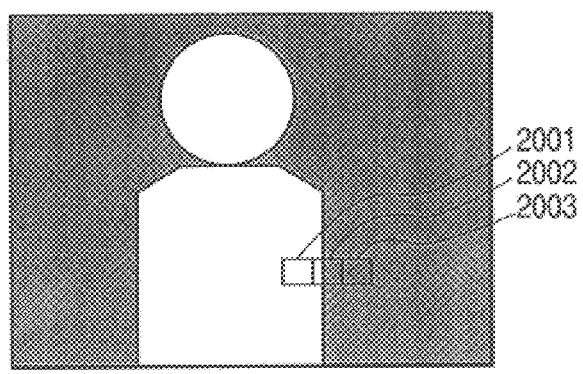
FIG. 33B   FIG. 33C   FIG. 33D
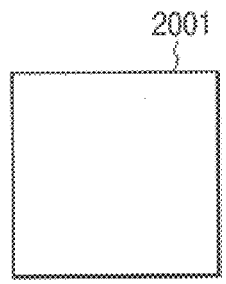   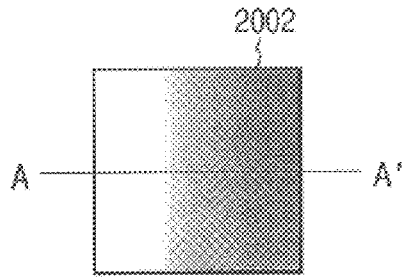   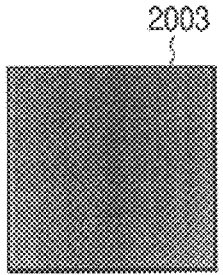

IMAGE INFORMATION PROCESSING APPARATUS AND ITS METHOD

BACKGROUND OF THE INVENTION

1. Field of the Invention

The invention relates to an image processing apparatus and its method for performing a separating and synthesizing process of a background and a foreground for a motion image.

2. Related Background Art

In recent years, in association with the spread of a personal computer in which an advanced CPU is installed, a request for an edition of a motion image which is executed on the personal computer has been increasing. As examples of an editing work, there are various works such as exchange of the time order between frames or fields, wiping, dissolving, mosaic, insertion of another image, and the like. Instead of processing an image on a frame or field unit basis, a technique for separating an image into meaning units (hereinafter, called objects) such as objects, backgrounds, characters, or the like in the image and performing an individual process is also being improved. By changing an encoding system or encoding parameter every object, a high efficient transmission or recording in which error withstanding performance is enhanced can be also performed. To perform the individual process on an object unit basis, the object has to be extracted from a frame or field image.

An object extracting method which has conventionally been used with respect to a motion image is called a "blue back". According to the blue back, a blue background is prepared in a studio set or the like and the blue portion is replaced with another background image by a switcher. As a method which is frequently used in a still image, a method of detecting and extracting an edge portion, a method of extracting by providing a threshold value for a signal level, or the like has been known. However, the conventional method using the blue back has a problem such that if a blue picture pattern exists in an area other than the background portion, such an area is erroneously recognized as a background. There is also a problem such that it is necessary to prepare studio equipment. Even in a digital process which can solve the above drawbacks, since it takes a long time for arithmetic operations, there is a problem such that in case of adapting to a motion image, real-time performance has to be sacrificed.

On the other hand, in association with the recent realization of high fineness of an image, the contents of information which the image has are changing. For example, there is a case where characters are superimposed onto a motion image and a resultant image is transmitted or a case where another image is superimposed to the motion image and the resultant image is transmitted. An amount of information which can be transmitted per unit time is increasing. The necessity to extract only necessary portions from a plurality of information and to store or re-edit them will further increase in future.

In case of separating a background object and a foreground object, however, there is hardly a case where a boundary portion of the object is clearly separated on a pixel unit basis. A blur area which is caused due to optical characteristics of an image pickup device exists and pixels in such a blur area are in a state where signal levels of the background and foreground are mixed. Such a situation is particularly typical with respect to a motion object. It is, therefore, important how to handle such a vague boundary area for a process of the object unit.

The problems to be solved by the invention will now be described in detail hereinbelow with reference to the drawings.

FIG. 1A shows an example of an original image which is used to separate a foreground object and a background object. A part of the image is divided into small blocks and explanation will now be made. Reference numeral 1001 denotes a block of the foreground object, 1002 a block of a boundary portion, and 1003 a block of a background portion. FIGS. 1B to 1D enlargedly show the blocks 1001 to 1003.

As will be understood from FIGS. 1B to 1D, values which are different from a value (data in the block 1001) which the foreground object has and a value (data in the block 1003) which the background object has exist in the boundary block 1002. FIG. 2 shows the luminance level of the image of this block on a line A–A'. In this example, the level from the luminance level of the foreground to the luminance level of the background smoothly changes.

According to the object extraction by the blue back, the value of the block 1003 corresponds to blue and the data at this level is removed as a background portion.

FIG. 3A shows a synthesized image obtained by superimposing another background into the background portion removed as mentioned above. FIGS. 3B to 3D are enlarged diagrams of the blocks 1001 to 1003. As will be understood from the block 1002 in FIG. 3C, even if the background object is replaced, a boundary area is in a state where data of the previous object is partially included. Therefore, discontinuous points are generated. FIG. 4 shows such a situation by the luminance level. In such a synthesized image, unnaturalness is conspicuous in an edge portion. Although a deviation of the luminance level causes a feeling of wrongness in the brightness of the edge, in case of a deviation of a color difference level, the edge is colored and the unnaturalness further increases.

To avoid such unnaturalness, a method whereby only a complete foreground object portion is extracted and synthesized to another background object without extracting data of a boundary area is also considered. FIG. 5A shows an example of such a case. FIGS. 5B to 5D enlargedly show the blocks 1001 to 1003. Since the data in the boundary area is not used, the foreground and background are clearly separated in the block 1002. FIG. 6 shows such a situation by the luminance level. According to an image obtained by merely simply superimposing the two objects as mentioned above, it feels as if an outline portion is visually emphasized. In this case as well, unnaturalness of the synthesized image is conspicuous.

A method of filtering the edge is also considered as an improved method of the above example. FIGS. 7A and 7B show examples in which a filtering process is performed to the image of FIG. 6. According to those examples, although the unnaturalness of the outline portion is reduced, since a width of boundary area to decide a degree of blur is unknown, FIG. 7A is the example in which the degree of blur is too smaller as compared with the original image and FIG. 7B shows the example in which the degree of blur is excessive.

According to the conventional method as mentioned above, it is extremely difficult to perform a natural image synthesization while accurately reproducing the boundary portion.

SUMMARY OF THE INVENTION

In consideration of the above circumstances, it is an object of the invention to provide an image processing apparatus and its method which can extract an object so as to obtain an accurate and natural image synthesization.

According to one preferred embodiment of the invention, there are provided an image processing apparatus and its method, wherein image data is inputted, the inputted image data is divided into blocks each constructed by a plurality of pixels, a motion of the image data is detected every block, and at least the image data of a first object and the image data of a second object are classified from the image data in accordance with a detection result.

According to another preferred embodiment of the invention, there are provided an image processing apparatus and its method, wherein image data is inputted, the image data is classified into at least a pixel of an area of a first object, a pixel of an area of a second object, and a pixel of a boundary area existing at a boundary between the area of the first object and the area of the second object, shape information to identify the area of the first object, the area of the second object, and the boundary area is formed, the classified image data and the formed shape information are encoded, and wherein the shape information is information showing at which mixture ratio the pixels of the classified boundary area are constructed with the pixels of the area of the first object and the pixels of the area of the second object.

Other objects, features and advantages of the invention will become apparent from the following detailed description taken in conjunction with the accompanying drawings.

BRIEF DESCRIPTION OF THE DRAWINGS

FIGS. 5A, 5B, 5C and 5D are a diagram showing a synthesized image (not including a boundary area) of the foreground of the original image and another background and enlarged diagrams of blocks around a boundary between a foreground area and a background area in the synthesized image;

FIGS. 33A, 33B, 33C and 33D are a diagram showing a synthesized image of a foreground of an original image and another background in the embodiment according to the invention and enlarged diagrams of blocks around a boundary between a foreground area and a background area in the synthesized image;

DETAILED DESCRIPTION OF THE PREFERRED EMBODIMENTS

An embodiment of the invention will now be described hereinbelow with reference to the drawings.

Figure 8:
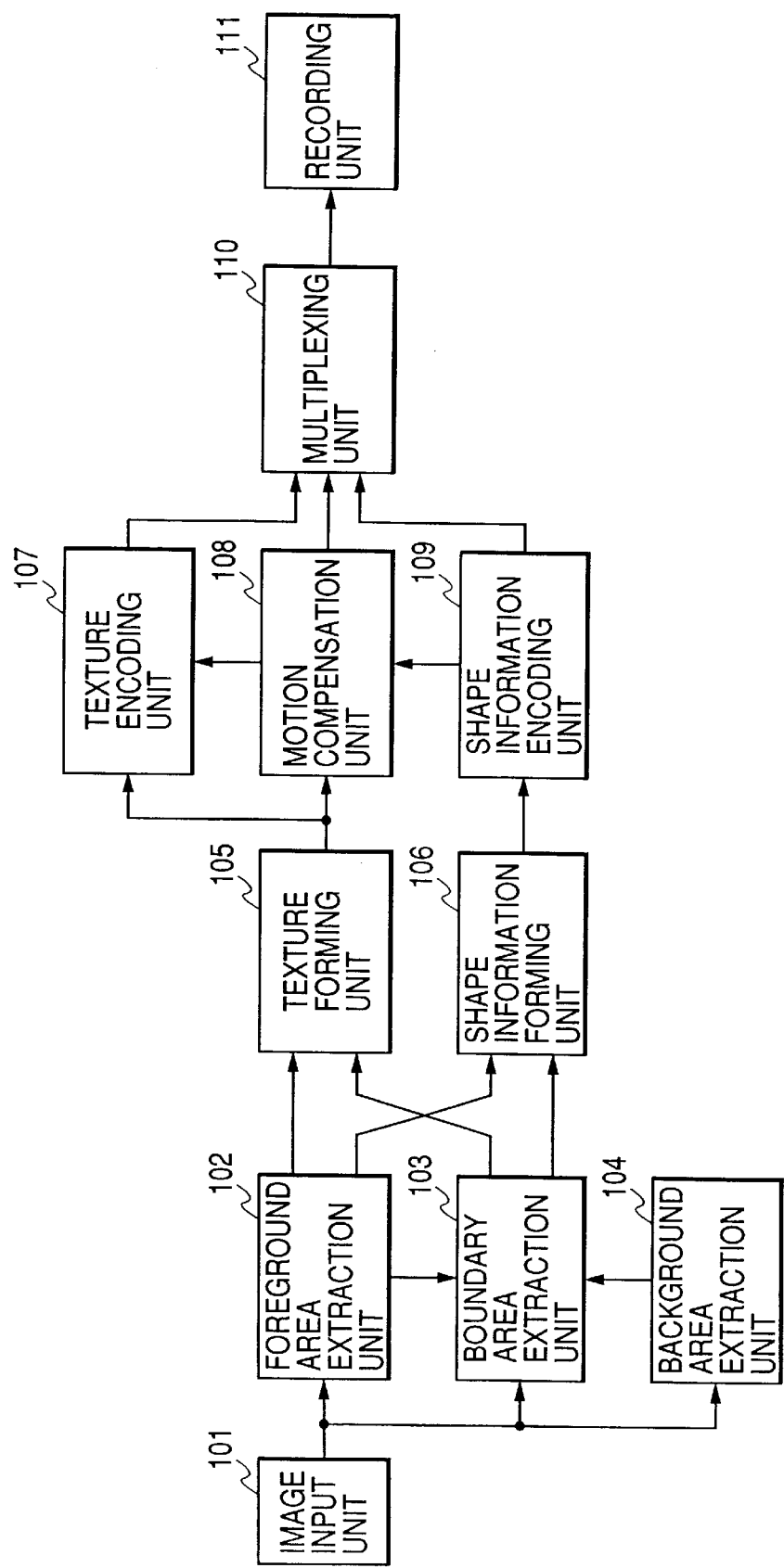
FIG. 8 is a block diagram showing a construction of an image encoding apparatus of an embodiment according to the invention.

FIG. 8 is a diagram showing a whole construction of an image encoding apparatus of the embodiment according to the invention.

First, a motion image of a predetermined format is fetched by an image input unit 101. When an input is an analog signal, the analog signal is A/D converted to digital data. In case of a color image, the color image is divided into a luminance signal and two color difference signals and a similar process is executed to each of those signals, respectively.

Although a texture forming unit 105 and a shape information forming unit 106 are necessary to encode an object, those data is formed on a pixel unit basis. The data obtained by a foreground area extraction unit 102 is stored as it is as texture data. As for the shape information, a value indicative of foreground data is inputted. As data obtained by a boundary area extraction unit 103, the data of a foreground area is used to form a texture. A value calculated and outputted from the foreground area extraction unit 102 and background area extraction unit 104 is used as shape information. In case of encoding a foreground object, the data derived by the background area extraction unit 104 is not directly used as texture data. The details of those processing algorithms will be described hereinlater.

The texture data and the shape information data are processed by a texture encoding unit 107 and a shape information encoding unit 109, respectively. A motion compensation unit 108 is necessary when differential data between the frames or fields is used. Those encoded data is collected at a system layer and multiplexed by a multiplexing unit 110. In case of collectively transmitting a plurality of objects, the processes so far are time divisionally executed and the resultant objects are multiplexed to one bit stream by the multiplexing unit 110. The one bit stream is recorded onto a medium such as optical disk, video tape, or the like by a recording unit 111.

Figure 9:
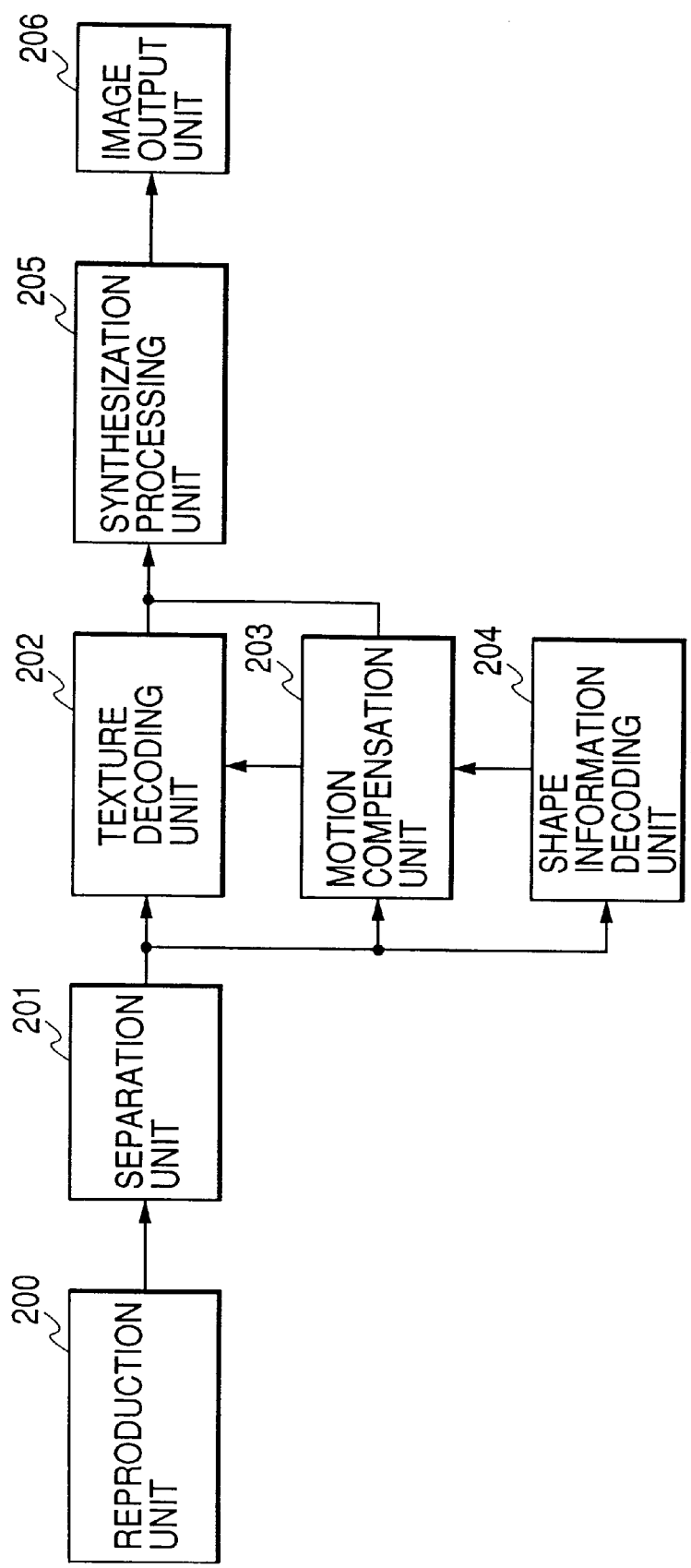
FIG. 9 is a block diagram showing a construction of an image decoding apparatus of an embodiment according to the invention.

FIG. 9 is a whole constructional diagram of an image decoding apparatus of the embodiment according to the invention and shows processes which are fundamentally opposite to those in FIG. 8. The encoded data reproduced by a reproduction unit 200 is supplied to a separation unit 201, by which the multiplexed data is separated from the encoded data. A decoding process is time divisionally performed by a texture decoding unit 202. A decoding process is successively performed by using the data decoded by a shape information decoding unit 204 and, if a motion compensation has been performed by a motion compensation unit 203, by using the motion compensated data. In a synthesization processing unit 205, a plurality of objects decoded on the basis of the description at the system layer are synchronously reconstructed. An image output unit 206 forms output data in accordance with a desired format.

Figure 10:
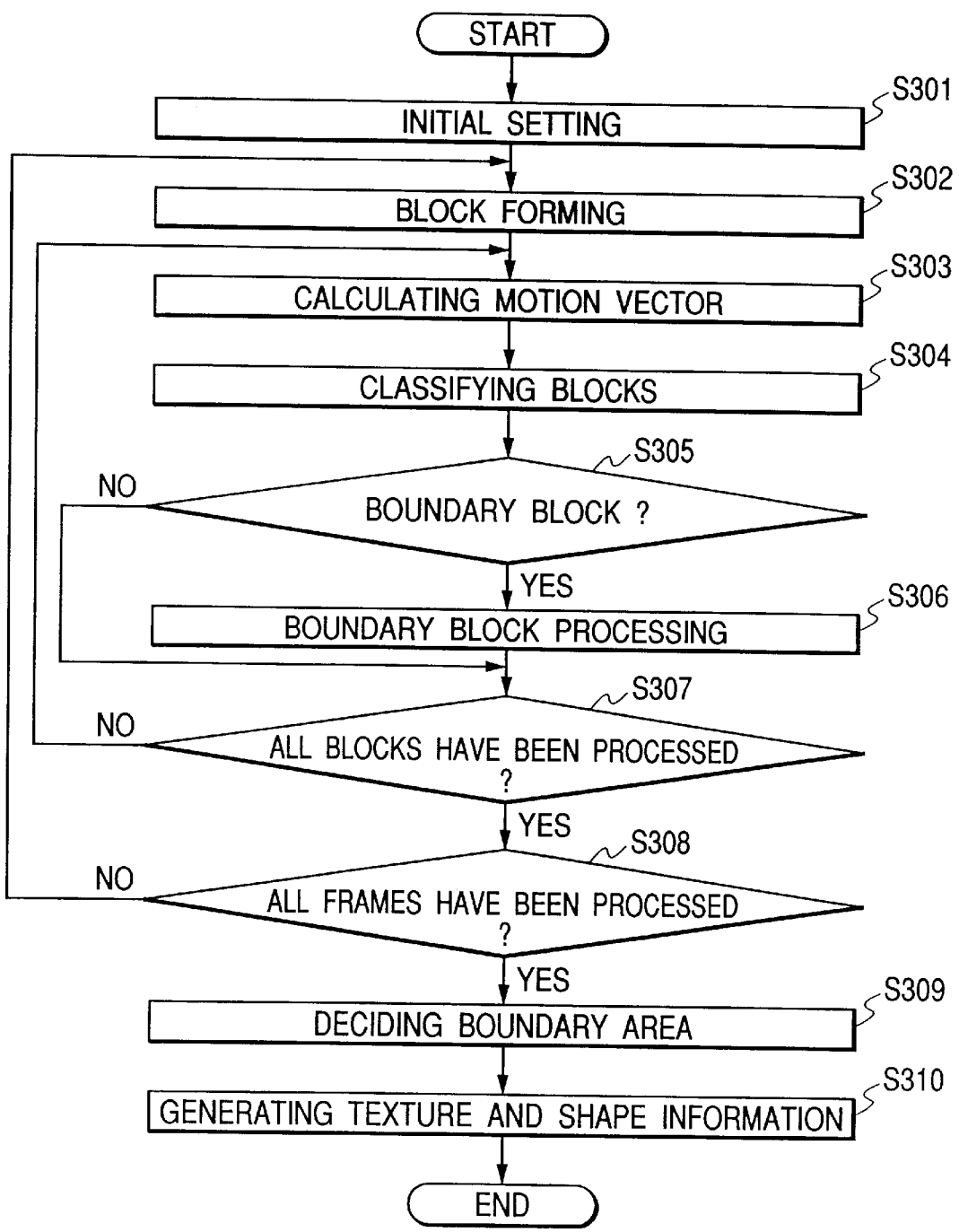
FIG. 10 is a flowchart showing an algorithm of a whole image process in the embodiment according to the invention.

A flow of the data in the respective units 102 to 106 in FIG. 8 will now be described in detail with reference to a flowchart of FIG. 10. FIG. 10 shows a whole algorithm of the above portion. First in step S301, an initial setting is performed. The number of frames as subjects to be processed, the number of the frame which is first used as a subject, a search range when a motion vector is obtained, and the like are specified.

In step S302, the frame as a subject is divided into blocks. In case of a color image, each frame is divided into blocks. Although a process by only the luminance signal is possible, a result of higher precision can be derived by adding a process of the color difference signals.

In step S303, a motion vector is detected between the sampling frames. This detection is executed with respect to all of the blocks and a sampling frame is changed as necessary and the motion vector detection is further performed.

The motion vectors are classified in step S304 on the basis of a large quantity of motion vector data obtained as mentioned above. As a discriminating method, it is sufficient to set the motion vector having the largest motion vector value to a background object portion and to use the motion vector having the second largest motion vector value to a foreground object portion. A boundary block exists at the position sandwiched by the foreground block and the background block. In the classification of the motion vectors, there are a case where they can be classified, from one sampling frame and a case where they are classified from a plurality of sampling frames.

If the motion vectors can be classified on a block unit basis, they are further divided on a pixel unit basis. All of the pixels in the block of each of the foreground block and the background block can be regarded as the pixels in the same classification. Only the boundary block is selected in step S305 and is classified on a further fine unit basis in step S306. By converging the foreground portion and the background portion in the block, a boundary area can be decided. By determining the foreground and the background from a plurality of sampling frames, a boundary area can be decided at high precision.

A check is made in step S307 to see if the processes have been finished for all of the blocks. A check is further made in step S308 to see if the processes have been finished for all of the frames.

At a time point when the processes of all of the subject frames are finished, the boundary area is decided in step S309 and a state where the objects can be separated is obtained.

Subsequently, a texture and shape information are formed for all of the frames and all of the pixels in step S310.

The classifying processes of the foreground area, background area, and boundary area will now be described further in detail with reference to a flowchart of FIG. 11.

Figure 12A:
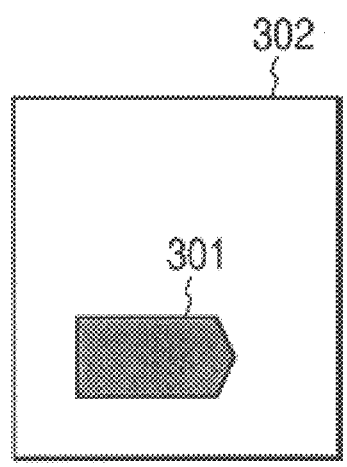
FIGS. 12A and 12B are diagrams for explaining the motion of an object between frames according to the embodiment.
Figure 12B:
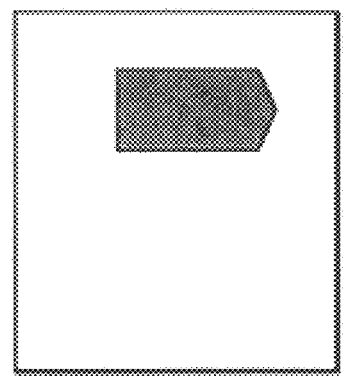

As shown in FIGS. 12A and 12B, a case where a foreground object 301 has been moved to another location within a time of one frame (from a previous frame of FIG. 12A to a current frame of FIG. 12B) will be described as an example. It is assumed that a background 302 is not moved.

Figure 11:
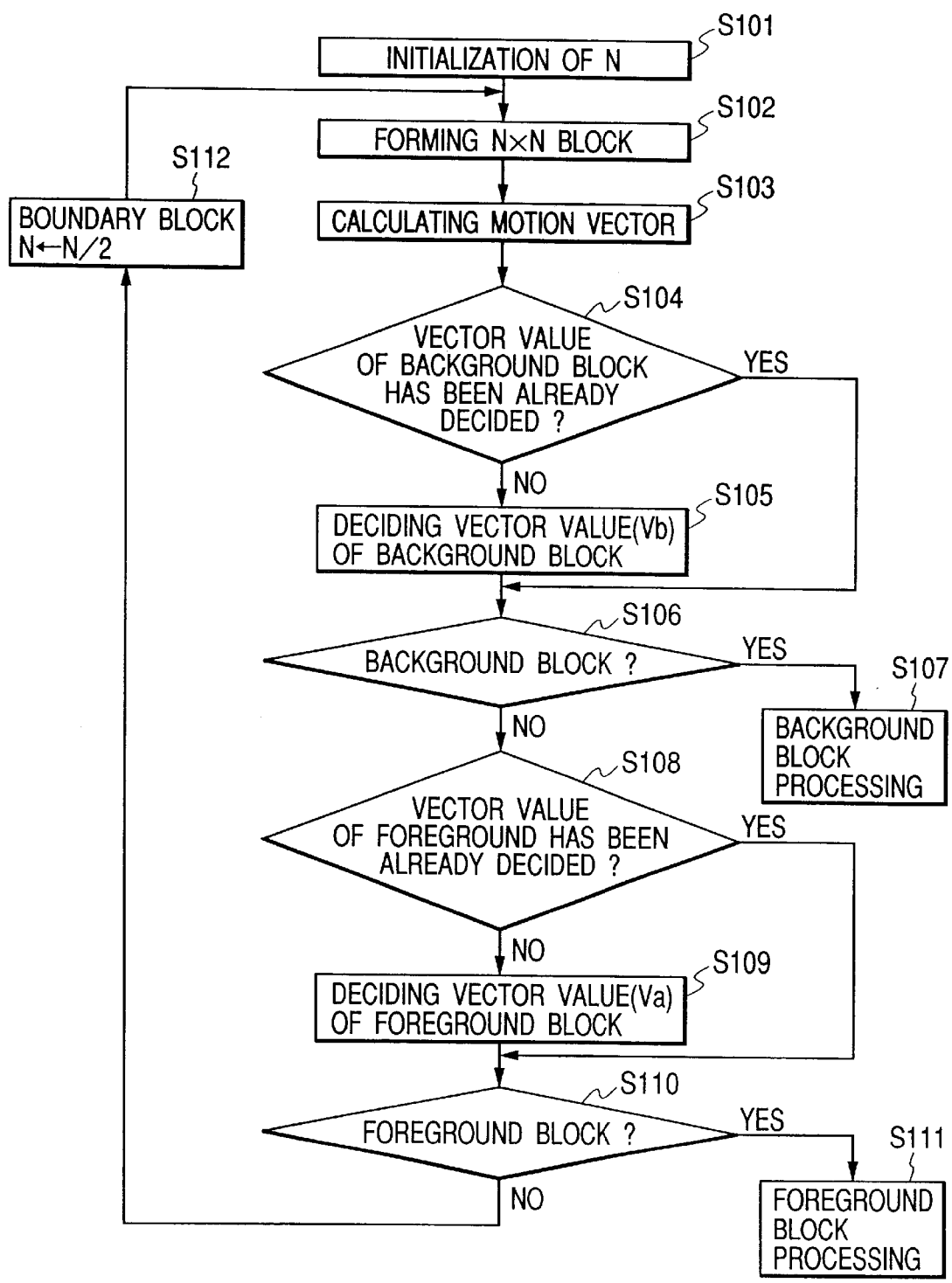
FIG. 11 is a flowchart showing the operation to classify the foreground area, background area, and boundary area in the embodiment according to the invention.
Figure 13:
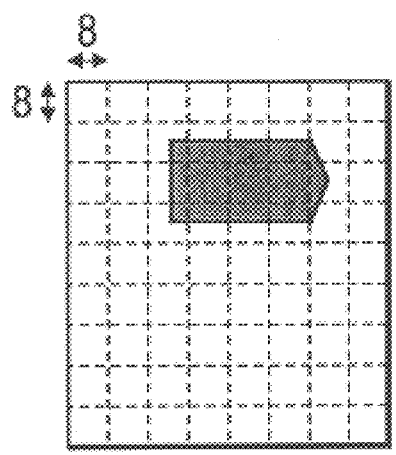
FIG. 13 is a diagram for explaining an (8×8)-block division in the embodiment.

In FIG. 11, first, an image of the current frame shown in FIG. 12B is divided into a plurality of blocks. That is, as first step S101, an initial value of a size of an (N×N)-block is determined. Explanation will now be made on the assumption that the initial value is equal to N=8, namely, one block has a size of (8×8). After the block size was initialized, the image is divided into blocks in step S102. FIG. 13 is a diagram showing the block formed image at the initial stage.

Figure 14A:
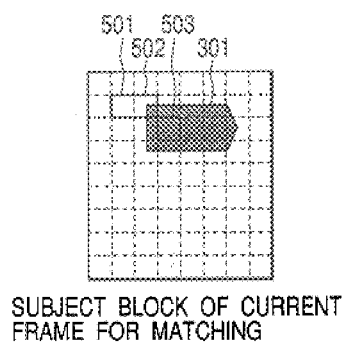
FIGS. 14A, 14B, 14C, 14D and 14E are diagrams for explaining a calculating method of a motion vector in the embodiment.

Subsequently, in step S103, a motion vector is calculated with regard to each of the divided blocks. As a method of calculating the motion vectors, there is a general method called a pattern matching such that the same image as the image of the subject block is searched from the previous frame. The pattern matching method will now be described with reference to FIGS. 14A to 14E. As shown in FIG. 14A, explanation will now be made with respect to typical blocks 501, 502, and 503 among the blocks of the current frame as an example.

Figure 14B:
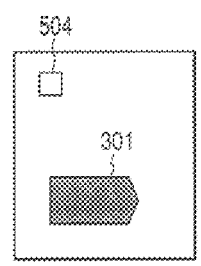

In case of an image such as a background which is not moving like a block 501, if the same image as the image of this block is searched, a block 504 in FIG. 14B corresponds to such an image. As shown in FIG. 14D, if the images of FIGS. 14A and 14B are overlapped and considered, since the positions of the blocks 501 and 504 on the screen are the same, a motion vector is equal to 0 (zero).

Figure 14C:
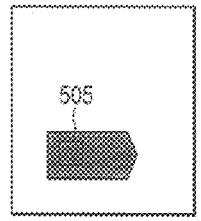
Figure 14D:
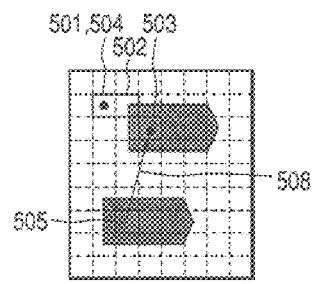
Figure 14E:
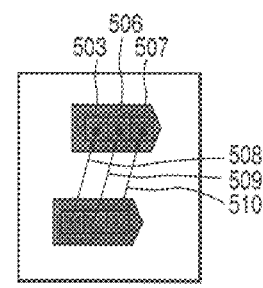

In case of an image of the foreground object 301 which was moved in parallel between the frames like a block 503, if the same image as the image of the block 503 is searched from the previous frame, a block 505 in FIG. 14C corresponds to such an image. As shown in FIG. 14D, if the images of FIGS. 14A and 14C are overlapped and considered, a motion vector 508 is obtained from the positional relation of the blocks 503 and 505. When the foreground object 301 includes a plurality of blocks like blocks 503, 506, and 507 in FIG. 14E, their motion vectors 508, 509, and 510 are the same.

Further, when the block includes both of the foreground image and the background image like a block 502, the image of the same pattern cannot be found out in the previous frame. In the ordinary pattern matching, since the motion vector is calculated from the block in which the least square error is the smallest between the pixels in the searched range, in the block 502, a vector value which is different from both of the motion vector in the object and the background motion vector is calculated.

At the stage where the motion vectors of all of the blocks included in one current frame image are obtained, each block is classified into the background block, foreground block, or boundary block of the foreground and the background. That is, first in step S104, a check is made to see if the motion vector value of the background block has already been decided. If it is not yet determined, step S105 follows and a motion vector value Vb of the background block has to be decided. Step S105 is a processing routine to decide the motion vector value Vb of the background block. However, if it has previously been known that the background image is not moved, it is sufficient to set 0 (zero) to the motion vector value Vb of the background block.

If the motion vector value Vb of the background block is decided, in next step S106, a comparison between the motion vector value of each block and the decided motion vector value Vb of the background block is performed for each block in the current frame, thereby discriminating whether the relevant block is the background block or not. With respect to the block in which the values almost coincide as a result of the comparison between the vector values, it is processed as a background block in step S107.

When the user wants to extract a foreground image (for example, in case of the foreground area extraction unit 102 in FIG. 8), the background block can be rejected. However, if the user wants to extract the background image (for instance, in case of the background area extraction unit 104 in FIG. 8), it is necessary to accumulate the data into a memory (not shown) in the background area extraction unit 104 until all of the background blocks are collected.

In next step S108, a check is made to see if the motion vector value to decide the foreground block has already been determined. If such a motion vector value is not decided, it has to be obtained. As mentioned above, since all of the blocks in the foreground object 301 have the same motion vector value, it is sufficient to set this value to the motion vector value Va of the foreground block in step S109.

When a motion vector value Va of the foreground block is determined, in step S110, a comparison between the motion vector value of each block and the decided motion vector value Va of the foreground block is performed to each block in the current frame, thereby discriminating whether the relevant block is the foreground block or not. Actually, even in case of the boundary block, if the motion vector value is almost the same as the motion vector value of the foreground block, it is decided as a foreground block. The block in which the value almost coincides as a result of comparison between the vector values is processed as a foreground block in step S111.

Figure 15:
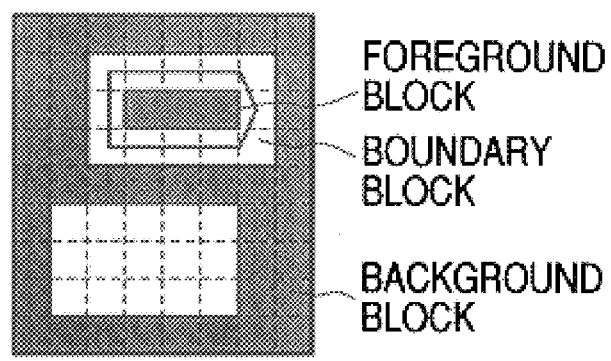
FIG. 15 is a diagram showing a classification result of each block in the embodiment.
Figure 16:
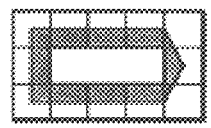
FIG. 16 is a diagram showing an (8×8)-boundary block in the embodiment.

If it is determined in steps S106 and S110 that the relevant block is none of the background block and the foreground block, such a block denotes the boundary block. As mentioned above, a plurality of blocks of the (8×8) size included in one current frame image can be classified into three kinds of background block, foreground block, and boundary block from the calculated motion vector value. A classified result is shown in FIG. 15. FIG. 16 is a diagram showing only the extracted boundary block.

Figure 17:
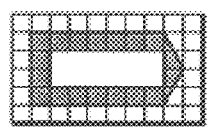
FIG. 17 is a diagram for explaining a (4×4)-block forming process of a boundary block in the embodiment.
Figure 18:
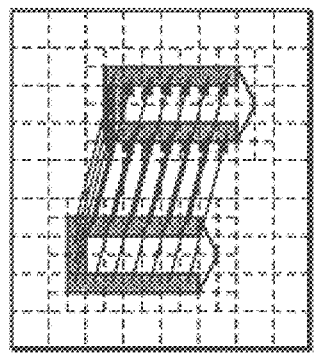
FIG. 18 is a diagram showing a motion vector calculation result in a (4×4)-block in the embodiment.

After completion of the classifying process as mentioned above, the block size of the boundary block is further divided into the half in the vertical and lateral directions in step S112, namely, N=4. The processing routine is returned to step S102 and the divided block is again divided into blocks. Each of a plurality of boundary blocks shown in FIG. 16 is further again divided into blocks of the size of (4×4) and a result is shown in FIG. 17. In step S103, a motion vector is calculated with respect to each of the boundary blocks which were again divided into the blocks of the size of (4×4). A result of calculation of the motion vector of the size of (4×4) is shown in FIG. 18.

Figure 19:
FIG. 19 is a diagram showing a (4×4)-boundary block in the embodiment.
Figure 20:
FIG. 20 is an enlarged diagram of FIG. 19.

In a manner similar to the above, processes in steps S104 to S112 are executed for the motion vector of the (4×4) block size as a subject. However, since the motion vector values Vb and Va to decide the background block and the foreground block have already been obtained, the processes in steps S105 and S109 are unnecessary. FIG. 19 shows the portion which is decided as a boundary block whose block size is equal to (4×4). FIG. 20 is an enlarged diagram of FIG. 19. The boundary block is further again divided into blocks of the size of (2×2). The processes in the above steps are repeated.

Figure 21:
FIG. 21 is a diagram for explaining a (2×2)-block forming process of the boundary block in the embodiment.
Figure 22:
FIG. 22 is a diagram for explaining a (1×1)-block forming process of the boundary block in the embodiment.
Figure 23:
FIG. 23 is a diagram showing an image extracted as a foreground in the embodiment.

After that, all of the blocks are classified into the background block and the foreground block and if there is no boundary block, the separating process of the foreground and background is finished. Since the minimum unit of the block size is equal to (1×1), this block is certainly classified into either the background block or the foreground block. FIG. 21 is a diagram showing a state when the boundary block is divided into blocks of (2×2). FIG. 22 is a diagram showing a state when the boundary block is further divided into the blocks of (1×1). When the foreground portion is extracted as a result in which all of the blocks were classified into the foreground and the background as mentioned above, the foreground image separated from the background is obtained as shown in FIG. 23.

As mentioned above, according to the separating process of the foreground and the background of the embodiment, the current frame of the motion image is divided into a plurality of blocks, the motion vector of each block is calculated between the images which are different with respect to the time, and the separation to the background image and the foreground image is performed by using the calculation result. Therefore, the inconvenience such that the blue image portion other than the background is erroneously recognized as a background as in the conventional blue back system can be prevented. The separation to the background and the foreground can be performed at a high speed by the simple algorithm such as the use of the calculated motion vector. The real-time performance of the motion image can be assured. A construction of the apparatus is also simplified.

Although the above embodiment has been described with respect to the case where the image of the background portion does not move, an example of a separating process in the case where the background portion also moves will now be described hereinbelow. In this embodiment, although a fundamental algorithm is similar to that in FIG. 11, a processing routine to decide the motion vector value Vb of the background block in step S105 differs from that in the foregoing embodiment. Images on the screen will be explained with reference to FIGS. 24 to 27.

Figure 24:
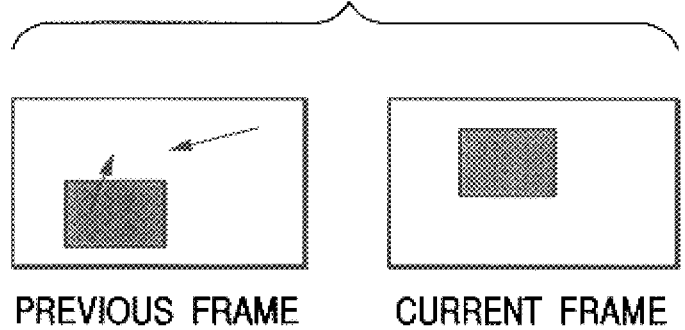
FIG. 24 is a diagram for explaining the motion of an object between frames according to the embodiment.

The embodiment will be described with respect to an example in which the foreground object moves from the lower position toward the upper position on the screen and the background moves from the right side toward the lower left side on the screen as shown in FIG. 24.

Figure 25:
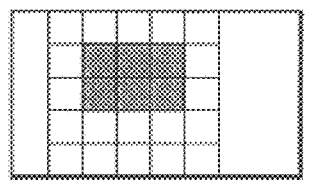
FIG. 25 is a diagram for explaining a block division in the embodiment.

FIG. 25 is an explanatory diagram of the block formation in step S102 in FIG. 11. Explanation will now be made by limiting to the foreground object and the blocks around it. By calculating motion vectors of those blocks in step S103 in FIG. 11, motion vectors as shown in FIG. 26 are obtained.

Figure 26:
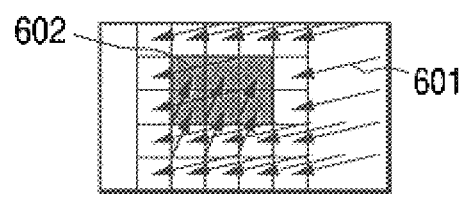
FIG. 26 is a diagram for explaining a calculating method of a motion vector in the embodiment.

Since there is no boundary block in the example of FIG. 26, the motion vectors can be classified into two kinds. One of the kinds relates to the motion vector Vb of the background block and the other relates to the motion vector Va of the foreground block. In the embodiment, the motion vectors having a larger occurrence frequency are decided as motion vectors Vb of the background block in step S105 in FIG. 11. In this case, motion vectors 601 in FIG. 26 are the motion vectors Vb of the background block.

Even if other almost uniform motion vectors surrounding the portion in which motion vectors 602 of the same value are collected are set to the motion vectors Vb of the background block, the same result will be obtained in this example.

Figure 27:
FIG. 27 is a diagram showing an image extracted as a foreground in the embodiment.

Since the boundary block is not included in this example, the processing routine is finished by one loop in steps S101 to S111 in FIG. 11. However, when a boundary block exists, the boundary block is classified into further small blocks in step S112 and the processes from step S102 are repeated. Until the block is divided into the minimum unit (namely, block of the size of (1×1)), the motion vectors Va and Vb of the foreground block and the background block are certainly obtained. Therefore, the processing routine is finished at a stage where all of the blocks have either one of the motion vector values. FIG. 27 is a diagram showing a foreground image extracted by this algorithm.

According to the embodiment as mentioned above, not only in the case where the background image is a still image but also even in case of a motion image which moves, the separating process of the background and the foreground can be certainly performed at a high speed.

In the above embodiment, the background image and the foreground image have been separated from the motion vector calculated every block. However, the invention is not limited to this method. For instance, the invention can be also similarly applied to the case of separating a portion which is moving on the screen and a portion which is not moving. Image portions having different motion vector values can be also separated, respectively.

In the above embodiment, whether the relevant block is the background block or the foreground block has been discriminated every divided block and in the case where the relevant block is none of the background block and the foreground block, it is determined that the block is the boundary block. However, the discrimination about the boundary block can be also realized by checking whether the relevant block is neighboring to the background block or not. Even if the relevant block is adjacent to the background block, so long as the motion vector of this block is the same as that of the internal block of the foreground, it is determined that the relevant block is the foreground block.

An algorithm to form the texture and shape information in the embodiment according to the invention will now be described in detail with reference to FIG. 28.

First in step S401, a check is made to see if the pixel which is a subject at present is the pixel in the foreground area. If YES, its value is stored as it is as texture data in step S402. The shape information is further determined in step S403. It is now assumed that the shape information is shown by a state of 8 bits, ($\alpha$=255) denotes a foreground portion of 100%, and ($\alpha$=0) denotes a background portion of 100%.

In step S404, a check is made to see if the pixel which is at present a subject is the pixel in the background area. If YES, a padded value is used as texture data in step S405. When the foreground object is encoded, since the background image data is unnecessary, desired data can be filled into the background portion. To raise an encoding efficiency, the operation to repetitively fill the data of an edge portion of the foreground or to fill a predetermined value is executed. The shape information in step S406 is set to ($\alpha$=0).

A check is subsequently made in step S407 to see if the pixel which is at present a subject is the pixel in the boundary area. If YES, a foreground area pixel at the position that is the nearest to such a pixel is obtained in step S408. The value of the foreground area pixel is set to the texture data in step S409. In step S410, the background area pixel at the position that is the closest to such a pixel is also obtained. The shape information is calculated in step S411 on the basis of those pixel values. Now, assuming that the value of the foreground pixel at the nearest position from the boundary pixel is labeled to A and the value of the background pixel is labeled to B and the value of the boundary pixel is labeled to M, shape information $\alpha$ of the boundary area is obtained by the following equation.

$$\alpha = 255 \cdot (M-B)/(A-B) \tag{1}$$

Figure 29:
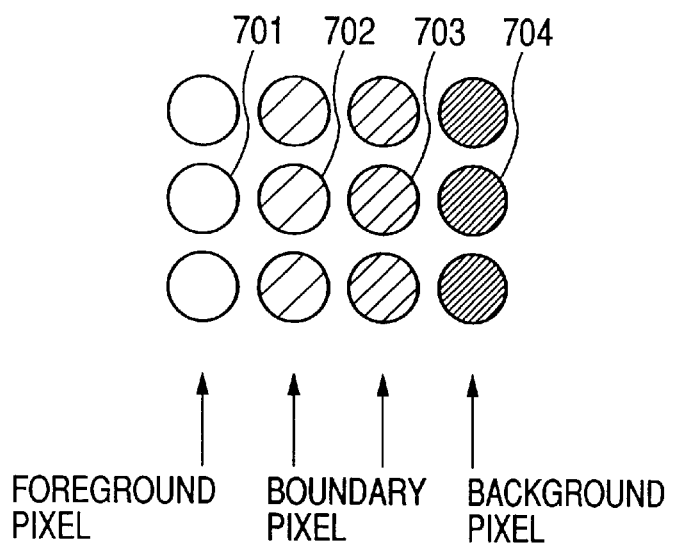
FIG. 29 is a constructional diagram showing an example of boundary pixels.
Figure 30:
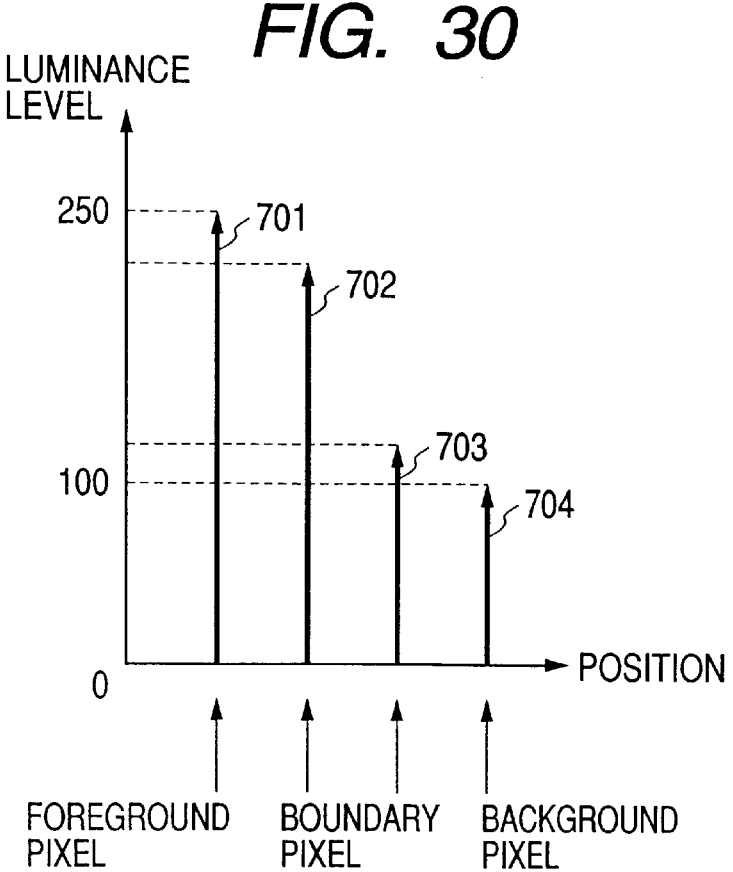
FIG. 30 is a characteristics diagram showing the relation between a luminance level and a pixel position.

A specific example in this case will now be described with reference to FIGS. 29 and 30. FIG. 29 shows an example of pixels near the boundary area. Reference numeral 701 denotes foreground pixels, 702 and 703 boundary pixels, and 704 background pixels. The foreground pixels at the position that is the nearest to the boundary pixels 702 are the pixels 701. The background pixels at the positions that is the closest to the boundary pixels 702 are the pixels 704. The same shall also similarly apply to the boundary pixels 703. FIG. 30 shows luminance levels of the pixels 701 to 704.

Now, assuming that a value of the foreground pixel 701 is equal to 250, a value of the boundary pixel 702 is equal to 220, a value of the boundary pixel 703 is equal to 120, and a value of the background pixel 704 is equal to 100, the shape information in the boundary pixel 702 is obtained as follows.

$$\alpha=255\cdot(220-100)/(250-100)=204 \qquad (2)$$

The shape information in the boundary pixel 703 is obtained as follows.

$$\alpha=255\cdot(120-100)/(250-100)=34 \qquad (3)$$

Figure 1A:
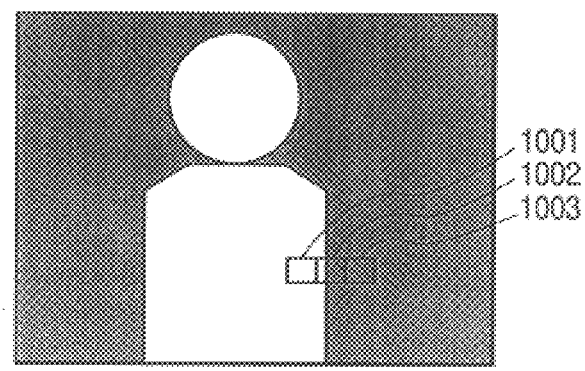
FIGS. 1A, 1B, 1C and 1D are a diagram showing an original image and enlarged diagrams of blocks around a boundary between a foreground area and a background area in the original image.
Figure 1B:
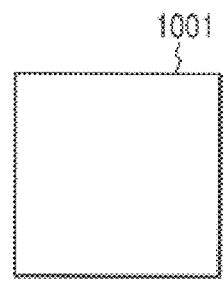
Figure 1C:
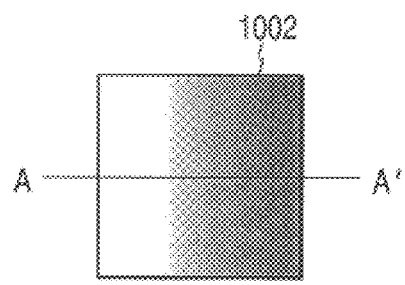
Figure 1D:
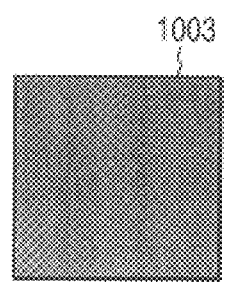
Figure 2:
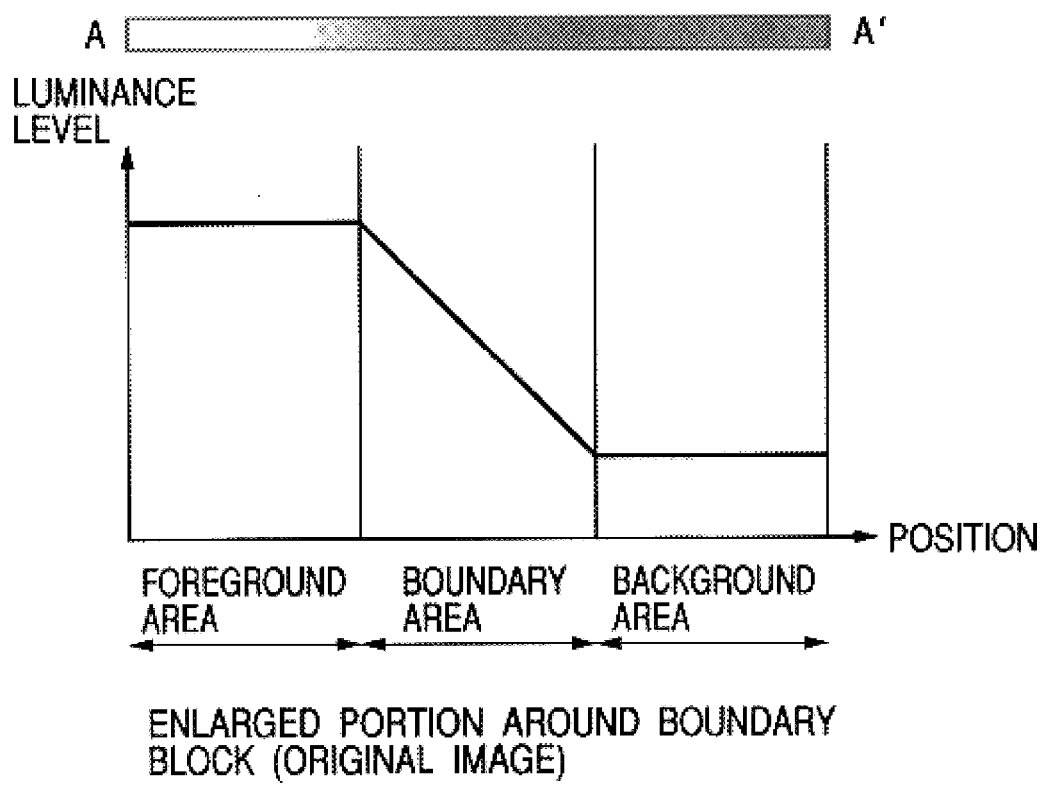
FIG. 2 is a partial enlarged diagram of the block around the boundary in FIGS. 1A to 1D and a characteristics diagram showing the relation between a luminance level and a pixel position.
Figure 3A:
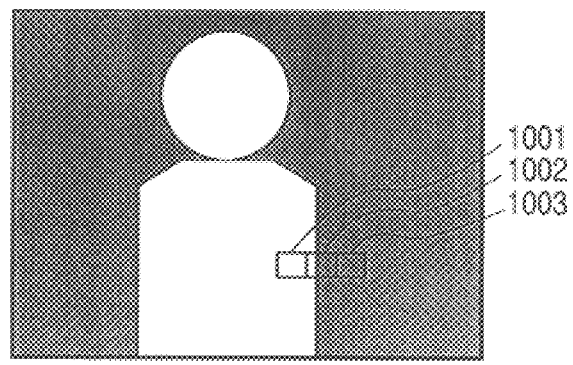
FIGS. 3A, 3B, 3C and 3D are a diagram showing a synthesized image (including a boundary area) of a foreground of the original image and another background and enlarged diagrams of blocks around a boundary between a foreground area and a background area in the synthesized image.
Figure 3B:
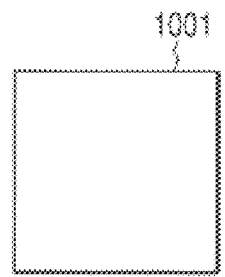
Figure 3C:
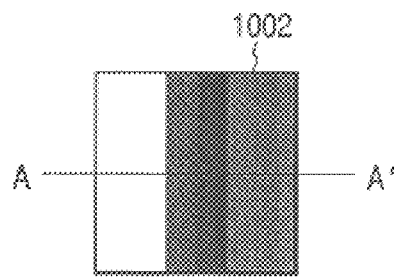
Figure 3D:
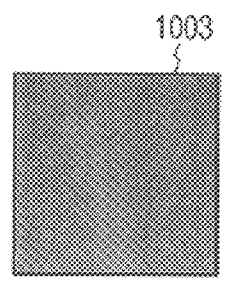
Figure 4:
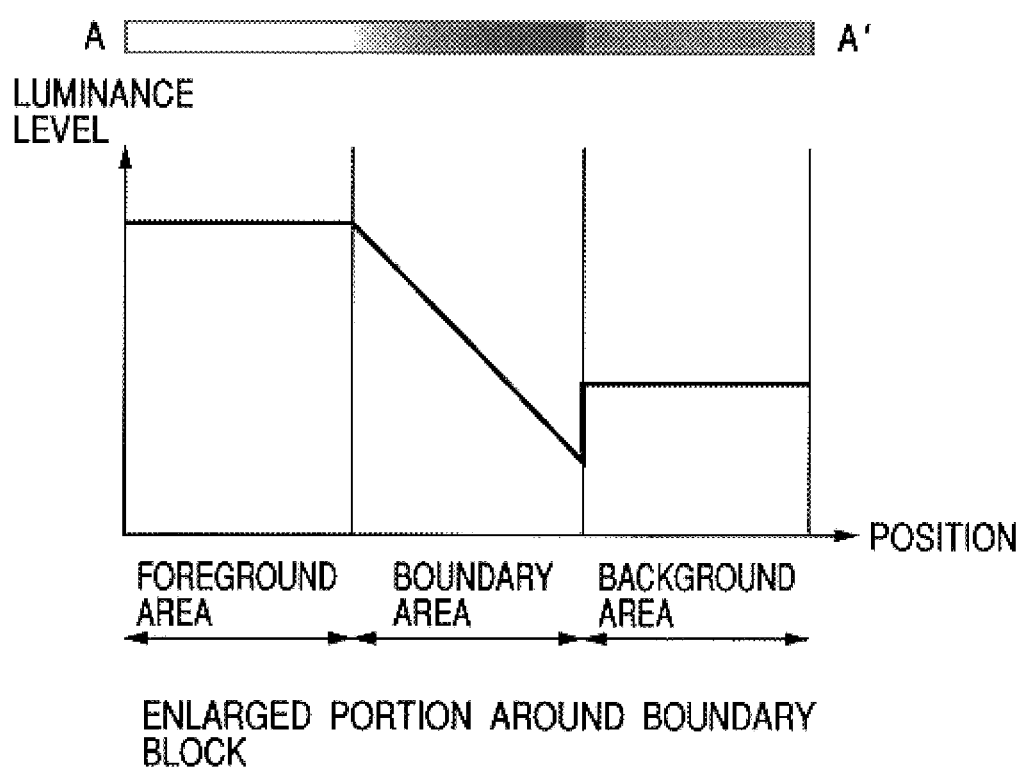
FIG. 4 is a partial enlarged diagram of the blocks around the boundary in FIGS. 3A to 3D and a characteristics diagram showing the relation between a luminance level and a pixel position.
Figure 6:
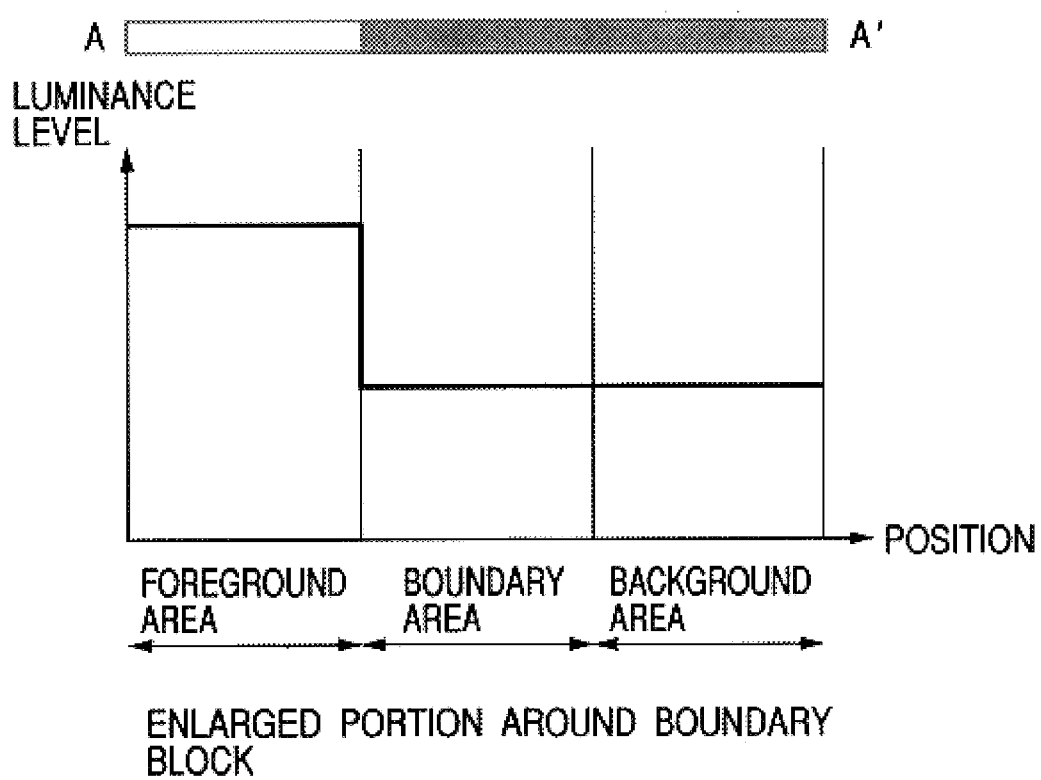
FIG. 6 is a partial enlarged diagram of the block around the boundary in FIGS. 5A to 5D and a characteristics diagram showing the relation between a luminance level and a pixel position.
Figure 7A:
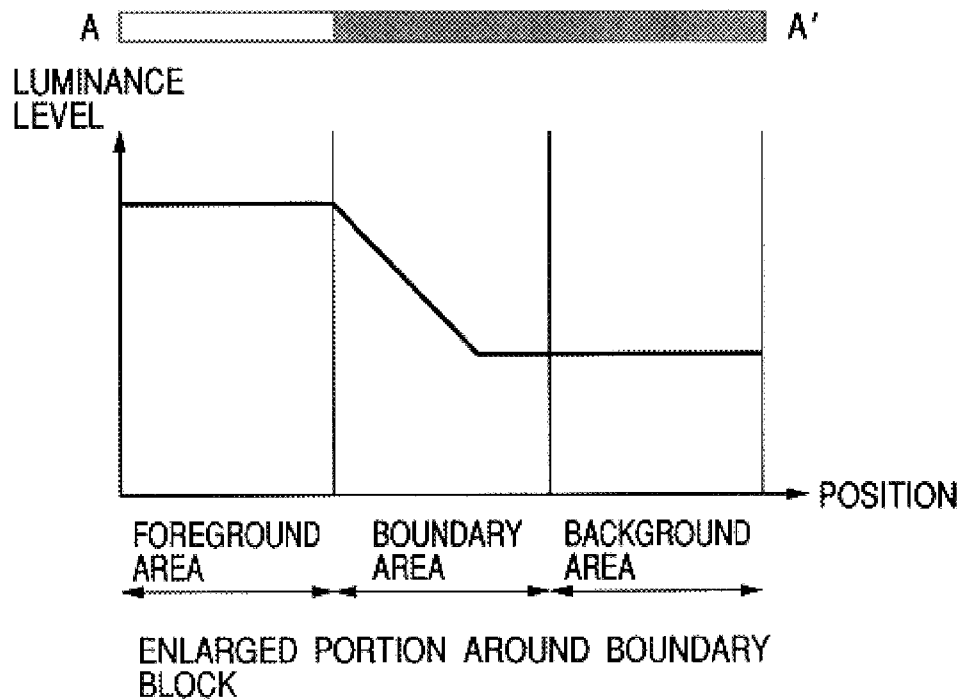
FIGS. 7A and 7B are partial enlarged diagrams of the block around a boundary between the foreground area and the background area when a filtering process is performed to the synthesized image in FIGS. 5A to 5D and characteristics diagrams showing the relation between the luminance level and the pixel position.
Figure 7B:
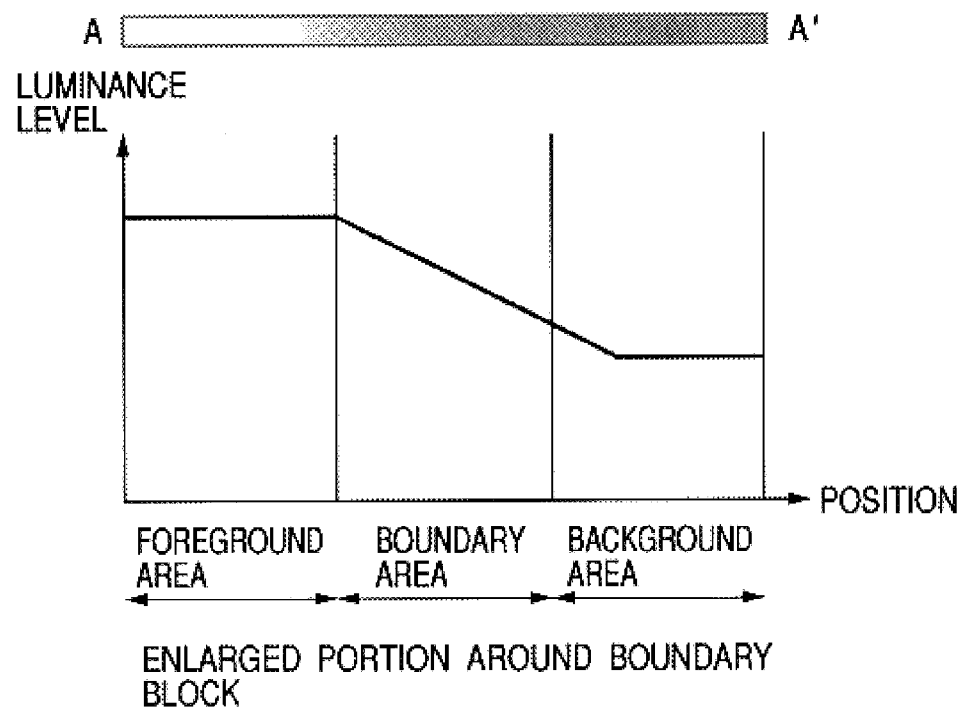
Figure 31:
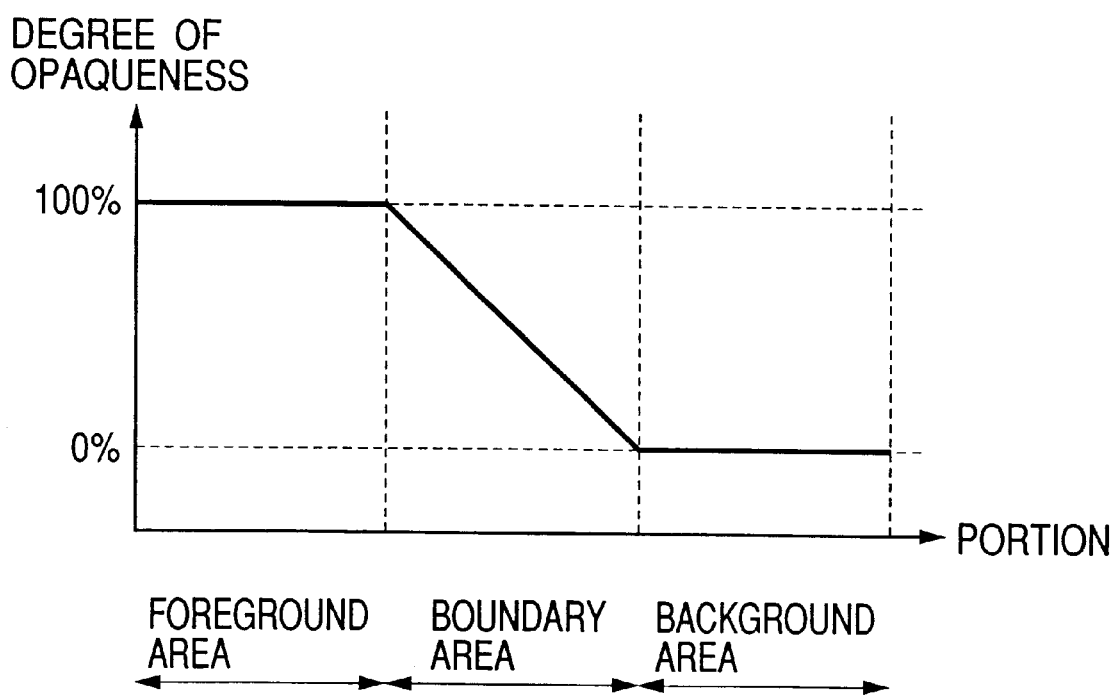
FIG. 31 is a diagram for explaining the formation of the shape information.

By repeating the processes as mentioned above, a check is made in step S412 to see if the processes for all of the pixels have been finished. Further, a check is made in step S413 to see if the processes for all of the frames have been finished. This processing routine is finished. FIG. 31 is a diagram for explaining the formation of the shape information in the example of FIG. 2 mentioned above. Since the shape information is the 8-bit data, the position of 0% in FIG. 31 is set to ($\alpha=0$) and the position of 100% is set to ($\alpha=255$).

Figure 32:
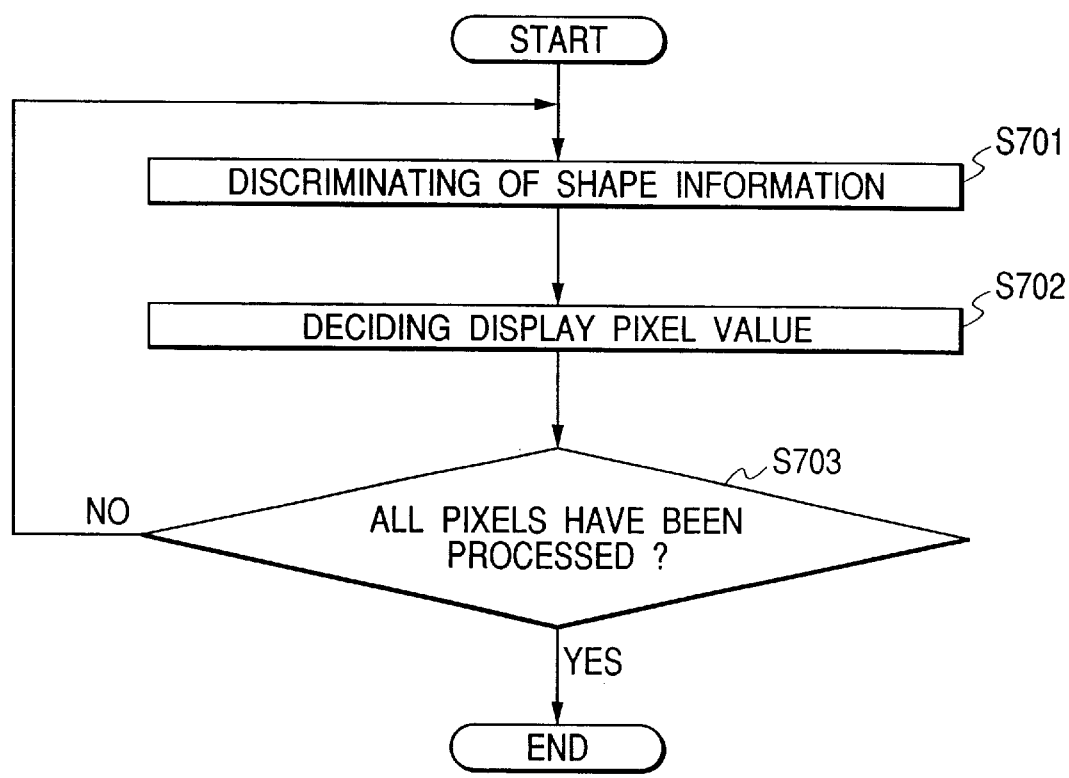
FIG. 32 is a flowchart showing an algorithm for a synthesizing process in the embodiment.

An algorithm for the synthesizing process will now be described with reference to FIG. 32. As will be obviously understood from the explanation of FIG. 28, in the present system, since all of the pixels have the pixel value and the shape information as a set, the algorithm for the synthesizing process is simple.

First in step S701, the shape information is discriminated and the pixel value of the display is determined in step S702.

Now, assuming that the value of the foreground pixel is set to A and the value of the background pixel is set to B and the pixel value to be obtained is set to M, M is expressed as follows.

$$M=A\cdot(\alpha/255)+B\cdot(1-\alpha/255) \qquad (4)$$

The above processes are repeated for all of the pixels. When it is decided in step S703 that those processes have been finished, the synthesizing processing routine is finished.

FIG. 33A is a diagram showing a synthesized image of another foreground image and a background image in the invention.

Figure 34:
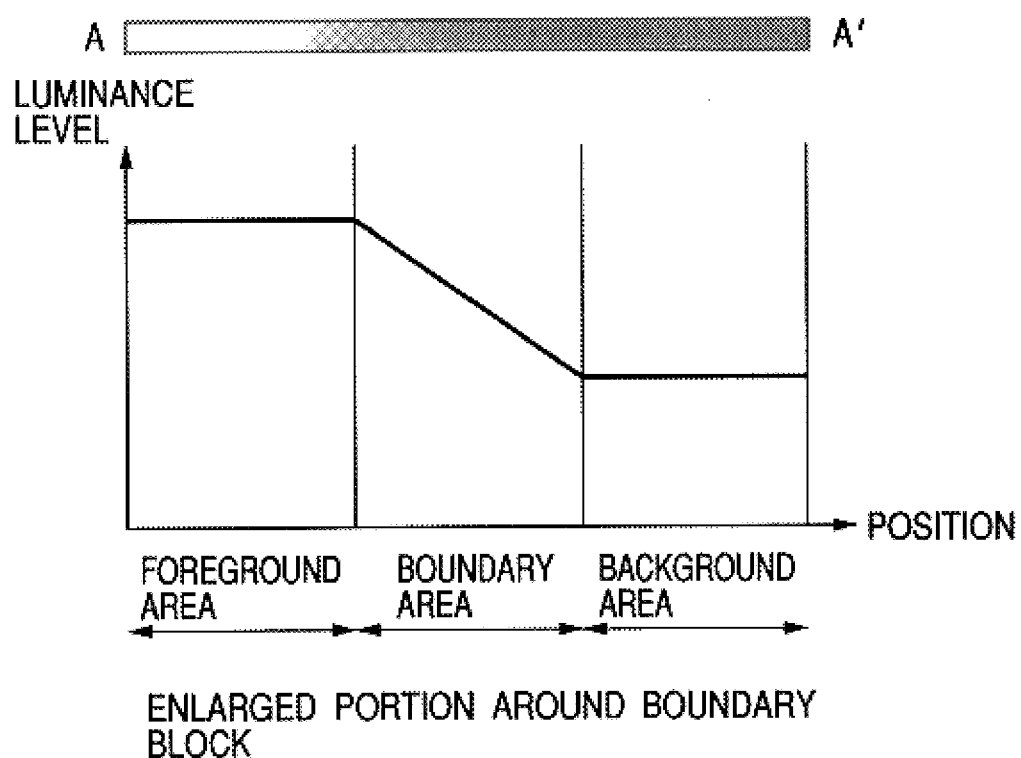
FIG. 34 is a partial enlarged diagram of the blocks around the boundary in FIGS. 33A to 33D and a characteristics diagram showing the relation between a luminance level and a pixel position.

FIGS. 33B to 33D are enlarged diagrams of blocks 2001 to 2003. FIG. 34 is an enlarged diagram of a luminance level on an A–A' line in FIG. 33C. As will be obviously understood from those diagrams, even in the synthesizing process in which the background object is changed, there is no unnaturalness in the outline portion and a degree of blur is smooth in a manner similar to the original image.

According to the embodiment, when the subject object is extracted from the motion image and is synthesized to another image, by obtaining the motion vector between the frames of the information in the boundary area, the object is separated into a perfect subject object area, a perfect background area, and a boundary area in which both of those areas mixedly exist. By also adding the shape information to the extracted image data, each area can be discriminated. At the time of an image synthesis, the pixel value of the boundary area is again calculated from the shape information.

With the above construction, the extraction of the object which can be easily re-processed and has a high generality can be easily and certainly performed.

Another embodiment of the forming process of the shape information will now be described.

Figure 28:
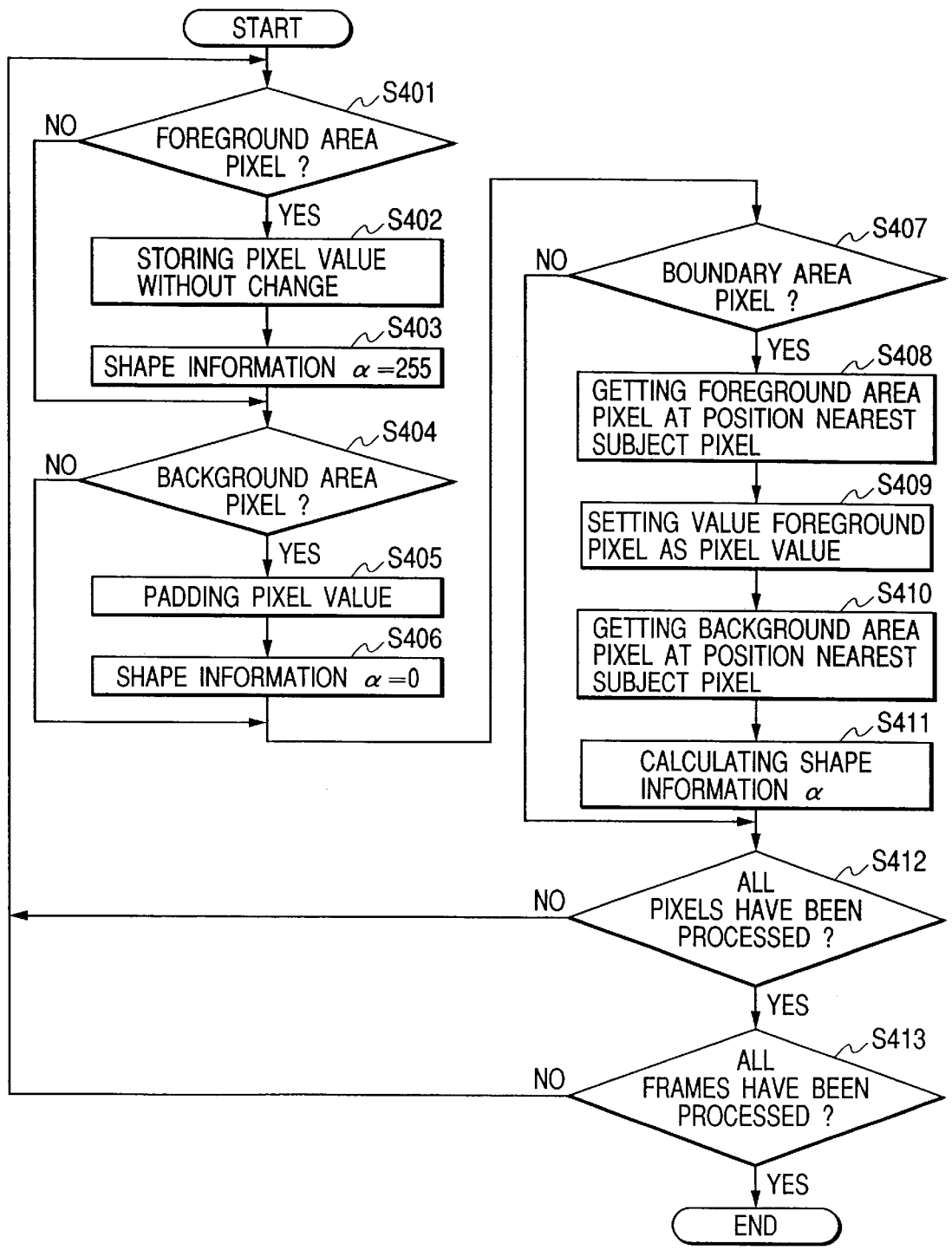
FIG. 28 is a flowchart showing an algorithm for generating a texture and shape information in the embodiment according to the invention.
Figure 35:
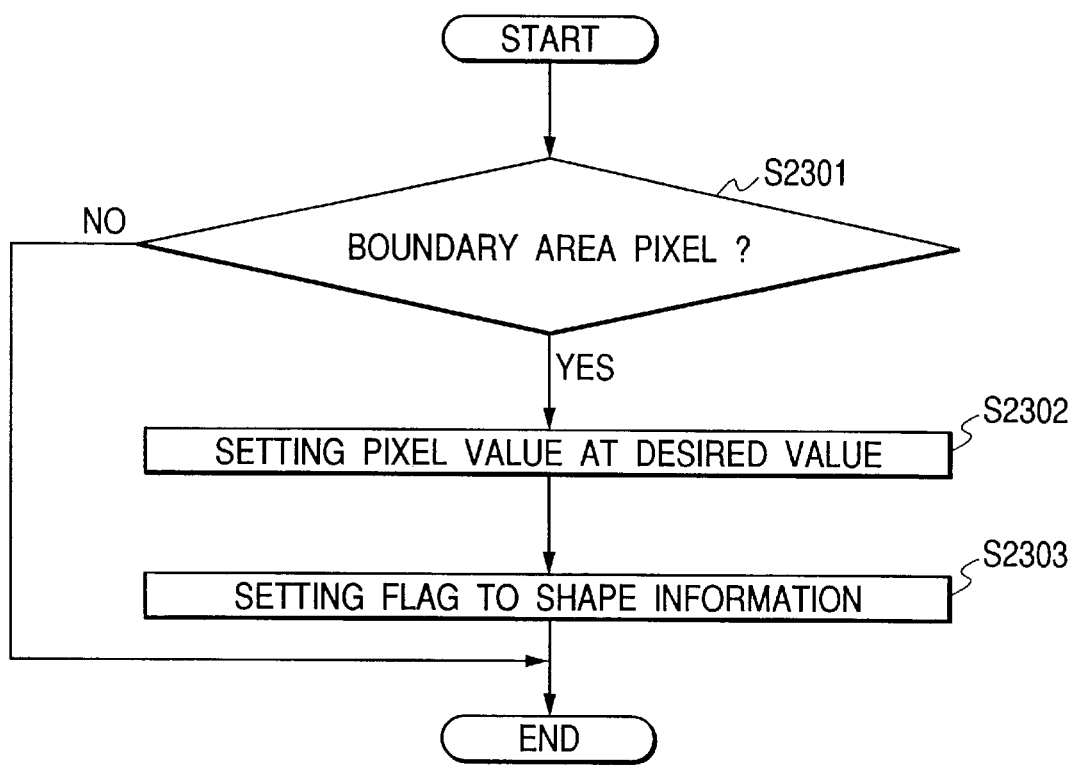
FIG. 35 is a flowchart showing an algorithm for a boundary process in the embodiment.

The embodiment uses an algorithm obtained by simplifying the algorithm to form the shape information and processes other than the processes in steps S407 to S411 in FIG. 28 are substantially the same as those mentioned above. Processes which are replaced to steps S407 to S411 will now be described with reference to FIG. 35. When the boundary pixel is determined in step S2301, an arbitrary value is set as texture data in step S2302. A padding can be also executed in a manner similar to the process for the background area in consideration of an encoding efficiency. In step S2303, a flag is set into the shape information. Any value can be used so long as the boundary area can be discriminated. That is, only the position information of the boundary area is stored here.

Figure 36:
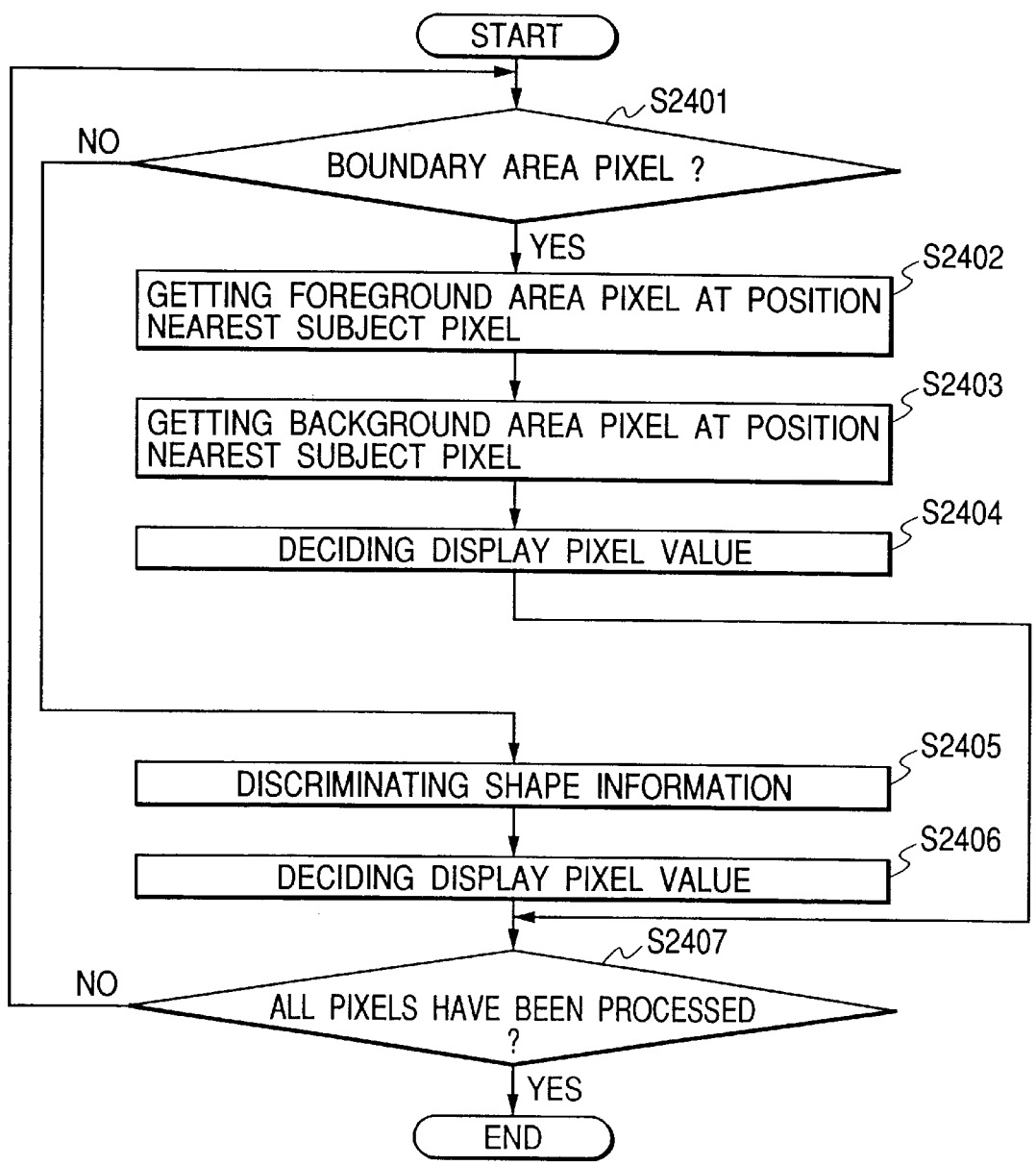
FIG. 36 is a flowchart showing an algorithm for a synthesizing process in the embodiment.

FIG. 36 is an algorithm for a synthesizing process in another embodiment. FIG. 36 differs from FIG. 32 with respect to a point that since there is no data in the boundary area, a forming process of this portion is added. When the pixel of the boundary area is decided in step S2401, a foreground area pixel at the position that is the nearest to such a pixel is obtained in step S2402. A background area pixel at the position that is the nearest to the pixel of the boundary area is obtained in step S2403. A value of the boundary pixel to be displayed is obtained by using the distances to the two pixels of the foreground pixel and the background pixel and the pixel values in step S2404.

It is now assumed that a value of the foreground pixel at the position which is the nearest from the boundary pixel is set to A, a value of the background pixel is set to B, a distance to the foreground pixel is set to a, and a distance to the background pixel is set to b. A value M of the boundary pixel is obtained by the following equation.

$$M=(A*b+B*a)/(a+b) \qquad (5)$$

Figure 37:
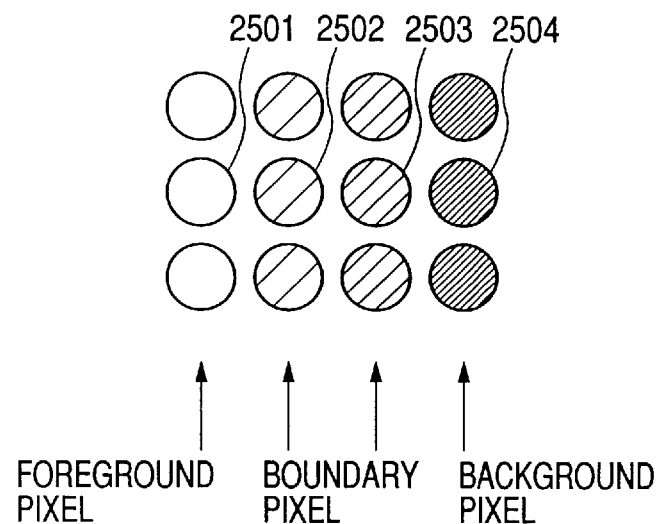
FIG. 37 is a constructional diagram showing an example of the boundary process in the embodiment.
Figure 38:
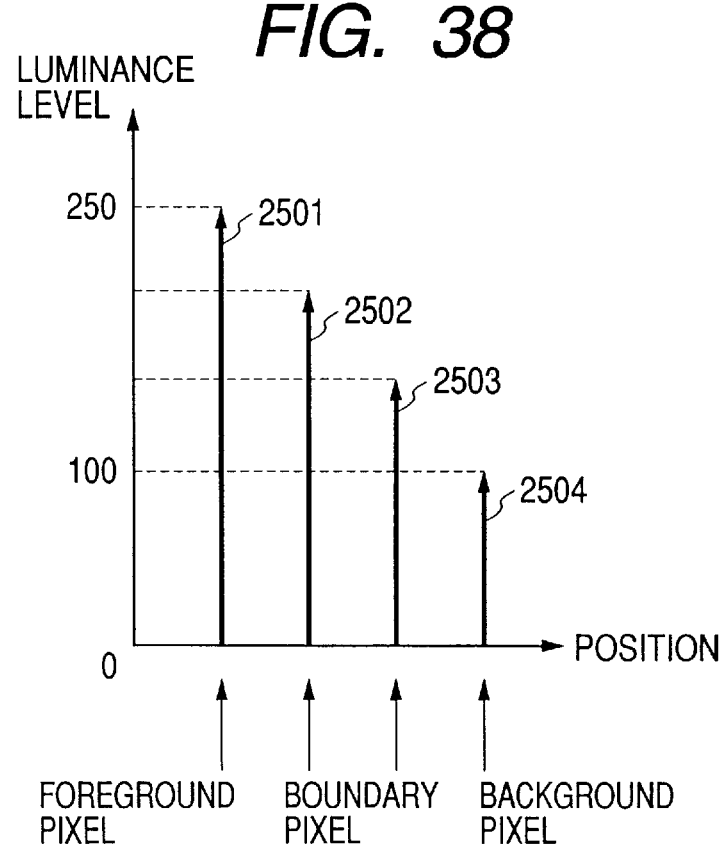
FIG. 38 is a characteristics diagram showing the relation between a luminance level and a pixel position in the embodiment.

Specific examples will now be described hereinbelow with reference to FIGS. 37 and 38. Reference numeral 2501 in FIG. 37 denotes foreground pixels, 2502 and 2503 pixels of the boundary area, and 2504 background pixels. FIG. 38 shows luminance levels of the pixels 2501 to 2504. Pixel values of the pixels 2502 and 2503 of the boundary area are calculated from those two data.

First, the foreground pixel at the position that is the nearest to the pixel 2502 of the boundary area is the pixel 2501, its value is A=250, and its distance is a=1. The background pixel at the position that is the nearest to the pixel 2502 is the pixel 2504, its value is B=100, and its distance is b=2. Therefore, the pixel value of the pixel 2502 is as follows.

$$M=(250*2+100*1)/(1+2)=200 \qquad (6)$$

Similarly, the foreground pixel at the position that is the nearest to the pixel 2503 of the boundary area is the pixel 2501, its value is A=250, and its distance is a=2. The background pixel at the position that is the nearest to the pixel 2503 is the pixel 2504, its value is B=100, and its distance is b=1. Therefore, the pixel value of the pixel 2503 is as follows.

$$M=(250*1+100*2)/(1+2)=150 \qquad (7)$$

The image processing apparatus of the invention can be applied to a system constructed by a plurality of apparatuses (for example, a host computer, interface equipment, a reader, a VTR, a TV, a printer, etc.) or can be also applied to an apparatus comprising one apparatus (for instance, a digital TV camera, a personal computer, a copying apparatus, or a facsimile apparatus).

A construction such that in order to make various devices operative so as to realize the functions of the foregoing embodiment, program codes of software to realize the functions of the embodiments are supplied to a computer in an apparatus or system which is connected to the various devices and the various devices are made operative in accordance with the programs stored in the computer (CPU or MPU) of the system or apparatus, thereby embodying the invention is also incorporated in the purview of the invention.

In this case, the program codes themselves of the software realize the functions of the foregoing embodiments. The program codes themselves and means for supplying the program codes to the computer, for example, a memory medium in which the program codes have been stored construct the invention. As a memory medium to store the program codes, it is possible to use any one of, for example, a floppy disk, a hard disk, an optical disk, a magnetooptical disk, a CD-ROM, a magnetic tape, a non-volatile memory card, an ROM, and the like.

It will be obviously understood that not only in the case where the functions of the foregoing embodiments are realized by executing the supplied program codes by the computer but also in the case where the functions of the foregoing embodiments are realized by the program codes in cooperation with the OS (Operating System) which is operating in the computer, another application software, or the like, the program codes are included in the embodiments of the invention.

Further, it will be also obviously understood that a case where after the supplied program codes were stored into a memory provided for a function expanding board of a computer or a function expanding unit connected to the computer, a CPU or the like provided for the function expanding board or function expanding unit executes a part or all of the actual processes on the basis of instructions of the program codes, and the functions of the foregoing embodiments are realized by the above processes is also incorporated in the invention.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) an input unit, arranged to input image data;
   b) a dividing unit, arranged to divide the image data inputted by said input unit into blocks, each block being constructed by a plurality of pixels;
   c) a detecting unit, arranged to detect a motion of the image data for each of the blocks;
   d) a classifying unit, arranged to classify at least image data of a first object and image data of a second object from the image data in accordance with an output of said detecting unit, wherein said classifying unit classifies a boundary block existing at a boundary between the image data of the first object and the image data of the second object, divides the boundary block into blocks of a smaller size, and executes a classification of objects; and
   e) a shape information forming unit, arranged to generate shape information for discriminating the image data of the first object and the image data of the second object, according to an output of said classifying unit.

2. An apparatus according to claim 1, wherein said classifying unit classifies a foreground block and a background block for each of the blocks.

3. An apparatus according to claim 2, wherein said classifying unit classifies a block, which hardly has a motion, as a background block.

4. An apparatus according to claim 2, wherein said classifying unit classifies blocks having an almost uniform motion as background blocks.

5. An apparatus according to claim 2, wherein, among blocks having an almost uniform motion, said classifying unit classifies each of the blocks arranged so as to surround other blocks of the blocks having the almost uniform motion as a background block.

6. An apparatus according to claim 5, wherein said classifying unit classifies each of the other blocks having the almost uniform motion as a foreground block.

7. An apparatus according to claim 2, wherein, among blocks having an almost uniform motion, said classifying unit classifies each of the blocks in which a number of the almost uniform blocks is maximum, as a background block.

8. An apparatus according to claim 7, wherein, among blocks having an almost uniform motion, said classifying unit classifies each of the blocks other than the blocks in which the number of the almost uniform blocks is maximum, as a foreground block.

9. An apparatus according to claim 1, wherein after a block size of the boundary block was changed, when block classification is again executed, said classifying unit uses a motion of a block which has first been determined to be a background block or a motion of a block which has first been determined to be a foreground block for classification of the boundary block.

10. An apparatus according to claim 1, further comprising an encoding unit, arranged to encode every object classified by said classifying unit.

11. An apparatus according to claim 1, wherein said classifying unit classifies a block of the first object, a block of the second object, and a boundary block existing at a boundary between the image data of the first object and the image data of the second object.

12. An image processing apparatus comprising:
   a) an input unit, arranged to input image data;
   b) a dividing unit, arranged to divide the image data inputted by said input unit into blocks, each of the blocks being constructed of a plurality of pixels;
   c) a detecting unit, arranged to detect a motion of the image data for each of the blocks;
   d) a classifying unit, arranged to classify at least image data of a first object and image data of a second object from the image data, in accordance with an output of said detecting unit, wherein said classifying unit classifies a block of the first object, a block of the second object, and a boundary block existing at a boundary between the image data of the first object and the image data of the second object, and then classifies pixels of an area of the first object, pixels of an area of the second object, and pixels of an area of the boundary, in accordance with an output of said classifying unit; and
   e) a shape information forming unit, arranged to generate shape information for discriminating the image data of the first object and the image data of the second object, according to an output of said classifying unit.

13. An apparatus according to claim 12, further comprising an image data forming unit, arranged to generate the image data of the area of the first object and the image data of the area of the boundary, in accordance with an output of said classifying unit.

14. An apparatus according to claim 13, wherein said shape information forming unit generates the shape information to identify the area of the first object, the area of the second object, and the area of the boundary, in accordance with an output of said classifying unit.

15. An apparatus according to claim 14, wherein the shape information for identifying the boundary area is calculated in accordance with a pixel value of the pixels of the boundary area, a pixel value of the area of the first object existing at a position that is the nearest to the pixels of the boundary area, and a pixel value of the area of the second object existing at a position that is nearest to the pixels of the boundary area, and denotes a ratio of the pixel value of the area of the first or second object included in the pixel value of the boundary area.

16. An apparatus according to claim 14, wherein the shape information for identifying the boundary area is calculated in accordance with a pixel value and a distance of the pixels of the area of the first object existing at a position that is nearest to the pixels of the boundary area and a pixel value and a distance of the pixels of the area of the second object existing at a position that is the nearest to the pixels of the boundary area.

17. An apparatus according to claim 14, further comprising a synthesizing unit, arranged to synthesize the image data of the first object with another image data by using the shape information.

18. An apparatus according to claim 14, further comprising an encoding unit, arranged to encode the image data formed by said image data forming unit.

19. An apparatus according to claim 18, further comprising a shape information encoding unit, arranged to encode the shape information generated by said shape information forming unit.

20. An apparatus according to claim 13, wherein said image data forming unit sets the image data of the pixels of the boundary area to a pixel value of the area of the first object existing at a position that is nearest to the pixels of the boundary area.

21. An image processing method comprising the steps of:
a) inputting image data;
b) dividing the inputted image data into blocks, each of the blocks being constructed of a plurality of pixels;
c) detecting a motion of the image data for each of the blocks;
d) classifying at least image data of a first object and image data of a second object from the image data, in accordance with a result of said detecting step, wherein said classifying step classifies a boundary block existing at a boundary between the image data of the first object and the image data of the second object, divides the boundary block into blocks of a smaller size, and executes a classification of objects; and
e) generating shape information for discriminating the image data of the first object and the image data of the second object, according to a result of said classifying step.

22. An image processing apparatus comprising:
a) input means for inputting image data;
b) classifying means for classifying the image data into at least pixels of an area of a first object, pixels of an area of a second object, and pixels of a boundary area existing at a boundary between the first object area and the second object area;
c) generating means for generating shape information to identify the area of the first object, the area of the second object, and the boundary area, the shape information of the boundary area being a value that is calculated according to pixel values of pixels of the areas of the first and second objects, which pixels are adjacent to the boundary area;
d) image data encoding means for encoding the image data classified by said classifying means; and
e) shape information encoding means for encoding the shape information generated by said generating means.

23. An apparatus according to claim 22, further comprising image data forming means for generating the image data of the area of the first object and the image data of the boundary area, in accordance with an output of said classifying means,
wherein said image data encoding means encodes the image data generated by said image data forming means.

24. An apparatus according to claim 23, wherein said image data forming means sets the image data of the pixels of the boundary area to a pixel value of the area of the first object existing at a position that is nearest to the pixels of the boundary area.

25. An apparatus according to claim 24, wherein the shape information for identifying the boundary area is calculated in accordance with a pixel value and a distance of the pixels of the area of the first object existing at a position that is nearest to the pixels of the boundary area and a pixel value and a distance of the pixels of the area of the second object existing at a position that is nearest to the pixels of the boundary area.

26. An apparatus according to claim 22, further comprising decoding means for decoding the encoded image data.

27. An image processing method comprising the steps of:
a) inputting image data;
b) classifying the image data into at least pixels of an area of a first object, pixels of an area of a second object, and pixels of a boundary area existing at a boundary between the area of the first object and the area of the second object;
c) generating shape information to identify the area of the first object, the area of the second object, and the boundary area, the shape information of the boundary area being a value that is calculated according to pixel values of pixels of the areas of the first and second objects, which pixels are adjacent to the boundary area;
d) encoding the image data classified in said classifying step; and
e) encoding the shape information generated in said generating step.

28. An image processing method comprising the steps of:
a) inputting image data;
b) dividing inputted image data into blocks, each of the blocks being constructed of a plurality of pixels;
c) detecting a motion of the image data for each of the blocks;
d) classifying at least image data of a first object and image data of a second object from the image data in accordance with a result of said detecting step, wherein said classifying step classifies a block of the first object, a block of the second object, and a boundary block existing at a boundary between the image data of the first object and the image data of the second object, and then classifies pixels of an area of the first object, pixels of an area of the second object, and pixels of an area of the boundary; and
e) generating shape information for discriminating the image data of the first object and the image data of the second object, according to a result of said classifying step.

* * * * *